United States Patent
Smith et al.

(10) Patent No.: US 9,459,843 B1
(45) Date of Patent: Oct. 4, 2016

(54) METHODS AND APPARATUSES FOR PROVIDING DYNAMIC DEFINITION AND SELECTION OF METRIC APPLICATIONS

(71) Applicant: McKesson Financial Holdings, Hamilton (BM)

(72) Inventors: Eric Smith, Falmouth, MA (US); Lucas Adams, Hadley, MA (US)

(73) Assignee: McKesson Financial Holdings, Hamilton (BM)

( * ) Notice: Subject to any disclaimer, the term of this patent is extended or adjusted under 35 U.S.C. 154(b) by 0 days.

(21) Appl. No.: 14/674,789

(22) Filed: Mar. 31, 2015

(51) Int. Cl.
*G06F 9/44* (2006.01)

(52) U.S. Cl.
CPC .............. *G06F 8/315* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 2006/0095562 A1* | 5/2006 | Agarwal | G06F 9/546 709/224 |
| 2010/0162215 A1* | 6/2010 | Purcell | G06F 8/77 717/127 |
| 2014/0173683 A1* | 6/2014 | Zhang | G06F 21/31 726/1 |
| 2015/0304186 A1* | 10/2015 | O'Sullivan | H04L 43/04 709/224 |

* cited by examiner

Primary Examiner — Daxin Wu
(74) Attorney, Agent, or Firm — Alston & Bird LLP

(57) ABSTRACT

A method, apparatus and computer program product are provided for generation, selection, and execution of metric applications. An example of the method includes receiving, via record access circuitry, the set of record data from a record repository, determining, by a processor and from the set of record data, record key data and one or more record data tables for the set of record data, selecting, by metric management circuitry, one or more metric applications based on a mapping performed between record key data and a metric registration structure, wherein the metric registration structure comprises metric application metadata indicating data types required by each of a plurality of metric applications, executing, by a processor, each of the selected one or more metric applications, determining an output of each of the executed selected one or more metric applications, and storing the output in a memory.

17 Claims, 4 Drawing Sheets

METHODS AND APPARATUSES FOR PROVIDING DYNAMIC DEFINITION AND SELECTION OF METRIC APPLICATIONS

TECHNOLOGICAL FIELD

Example embodiments of the present invention relate generally to methods and systems for selection of particular program code for execution against a data repository and, more particularly, to methods and systems for providing dynamic definition and selection of metric applications for execution against a data repository.

BACKGROUND

As more and more organizations switch to enterprise data storage systems, more and more information has become available for electronic review, analysis, and analytics. In fact, in many industries, programmatic analysis of stored data repositories is a requirement for various audit, regulatory, and certification processes. For example, in the healthcare field, access to federal funds by healthcare organizations (HCOs) may require strict compliance with certain performance measurement and reporting requirements, and contracts with insurers may require that HCOs adhere to certain minimum standards, and performance of physicians within HCOs may be assessed using industry standard measures and customized measures. To derive the data used to meet these requirements, enterprise computing systems may aggregate data from a variety of sources and apply metric calculations against these data sets. However, current products for performing this analysis are inflexible and often tightly coupled to particular data sets. With the move to remote storage and a corresponding increase in diversity among data types and stored content, such products require strict knowledge of input data sets and adherence to a rigid framework for processing of input data. Such products use statically defined metric calculation methods that require a developer to directly modify the source of the product in order to implement a new or alternative metric calculation. Furthermore, such products require manual identification of which metrics to execute against particular sets of input data, such that the system lacks any awareness of whether a given metric applies to a given set of input data absent a hard-coded association. Through applied effort, ingenuity, and innovation, Applicant has solved many of these identified problems by developing a technical solution that is embodied by the present invention, which is described in detail below.

BRIEF SUMMARY

Methods, apparatuses and computer program products are therefore provided according to example embodiments of the present invention in order to provide dynamic definition and selection of metric applications for execution against a data set. Embodiments include a method for executing metric applications against a set of record data. The method includes receiving, via record access circuitry, the set of record data from a record repository, determining, by a processor and from the set of record data, record key data and one or more record data tables for the set of record data, selecting, by metric management circuitry, one or more metric applications based on a mapping performed between record key data and a metric registration structure, wherein the metric registration structure comprises metric application metadata indicating data types required by each of a plurality of metric applications, executing, by a processor, each of the selected one or more metric applications, determining an output of each of the executed selected one or more metric applications, and storing the output in a memory.

The output of each of the executed selected one or more metric applications may include at least one result of a calculation performed by the metric application and a list of records included within the set of record data used to obtain the result of the calculation. Outputting each of the selected one or more metric applications may include compiling at least one of the selected one or more metric applications. At least one of the selected one or more metric applications may be generated by metric definition circuitry, and the method may include receiving, by the metric definition circuitry, metric definition data, determining at least one required data type for performing one or more calculations defined in the metric definition circuitry, and creating an entry in the metric registration structure. The entry may include a unique identifier associated with a metric application generated from the metric definition data and the at least one required data type. The metric definition data may be provided in a C# programming language. The record repository may be a cloud data storage system. The method may include generating the record key data and the record data tables upon receipt of the set of record data from the record repository by the record access circuitry. The record data tables may be formatted by the record access circuitry into a JavaScript Object Notation format.

Embodiments also include an apparatus for executing metric applications against a set of record data. The apparatus includes record access circuitry configured to receive the set of record data from a record repository, metric management circuitry, and metric processing circuitry. The metric management circuitry is configured to determine, from the set of record data, record key data and one or more record data tables for the set of record data, and select one or more metric applications based on a mapping performed between record key data and a metric registration structure. The metric registration structure includes metric application metadata indicating data types required by each of a plurality of metric applications. The metric management circuitry is also configured to cause execution of each of the selected one or more metric applications by the metric processing circuitry. The metric processing circuitry is configured to determine an output of each of the executed selected one or more metric applications, and to store the output in a memory.

The output of each of the executed selected one or more metric applications may include at least one result of a calculation performed by the metric application and a list of records included within the set of record data used to obtain the result of the calculation. Executing each of the selected one or more metric applications may include compiling at least one of the selected one or more metric applications. The apparatus may include metric definition circuitry configured to generate the selected one or more metric applications by receiving metric definition data, determining at least one required data type for performing one or more calculations defined in the metric definition circuitry, and creating an entry in the metric registration structure, the entry comprising a unique identifier associated with a metric application generated from the metric definition data and the at least one required data type. The metric definition data may be provided in a C# programming language. The record repository may be a cloud data storage system. The record access circuitry may be further configured to generate the record key data and the record data tables upon receipt of the set of record data from the record repository. The record data tables may be formatted by the record access circuitry into a JavaScript Object Notation format.

Embodiments may include a non-transitory computer readable storage medium comprising instructions that, when executed by a processor, configure the processor. The instructions configure the processor to receive the set of record data from a record repository, determine, from the set of record data, record key data and one or more record data tables for the set of record data, select one or more metric applications based on a mapping performed between record key data and a metric registration structure, wherein the metric registration structure comprises metric application metadata indicating data types required by each of a plurality of metric applications, execute each of the selected one or more metric applications, determine an output of each of the executed selected one or more metric applications, and store the output in a memory. The output of each of the executed selected one or more metric applications may include at least one result of a calculation performed by the metric application and a list of records included within the set of record data used to obtain the result of the calculation. Executing each of the selected one or more metric applications may include compiling at least one of the selected one or more metric applications. At least one of the selected one or more metric applications may be generated by metric definition circuitry, and the instructions may further configure the processor to, receive metric definition data, determine at least one required data type for performing one or more calculations defined in the metric definition circuitry, and create an entry in the metric registration structure, the entry comprising a unique identifier associated with a metric application generated from the metric definition data and the at least one required data type.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
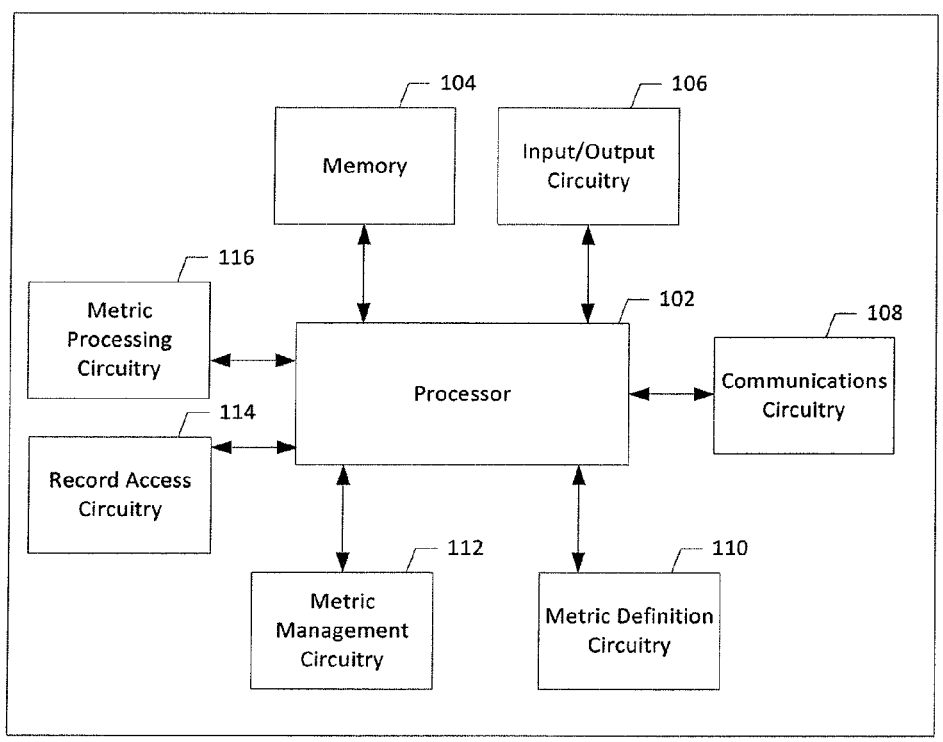
Figure 2:
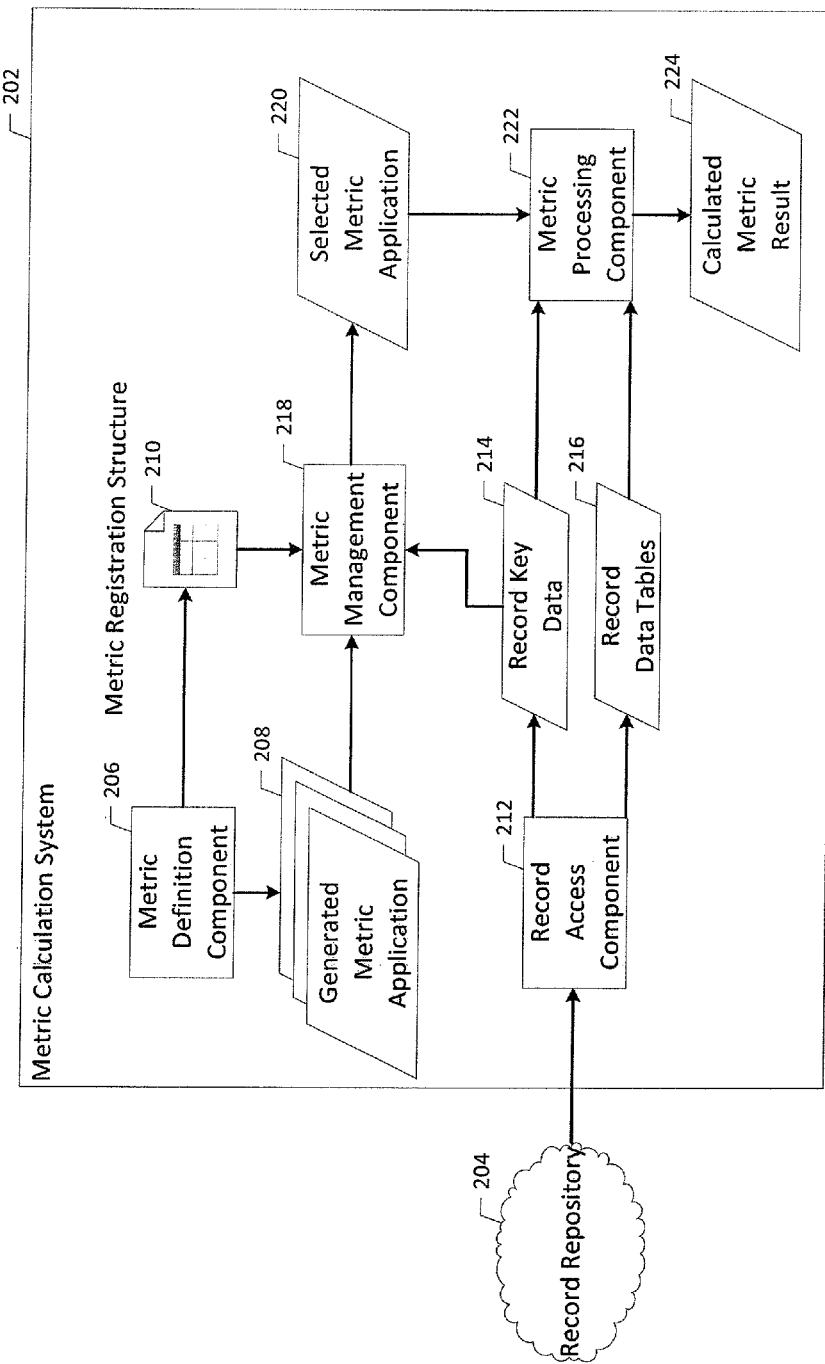
Figure 3:
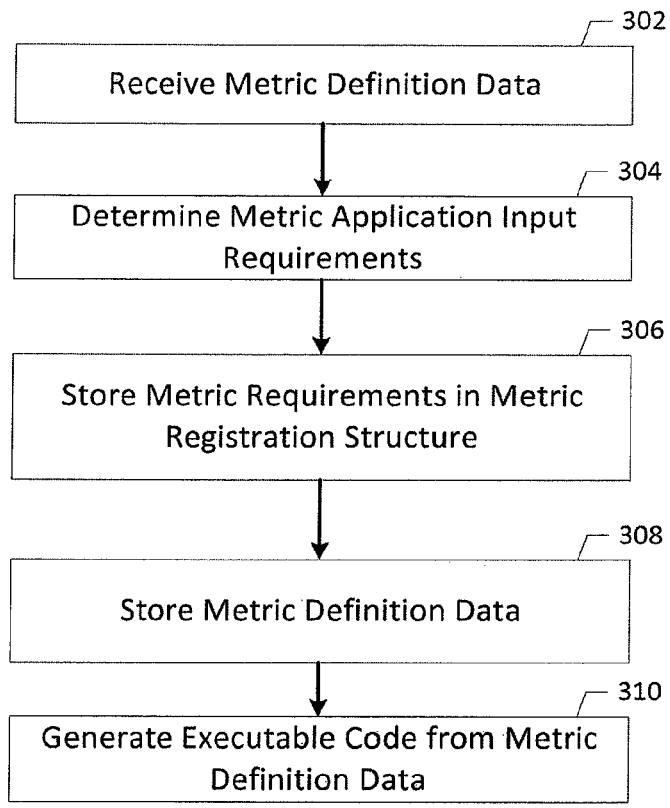
Figure 4:
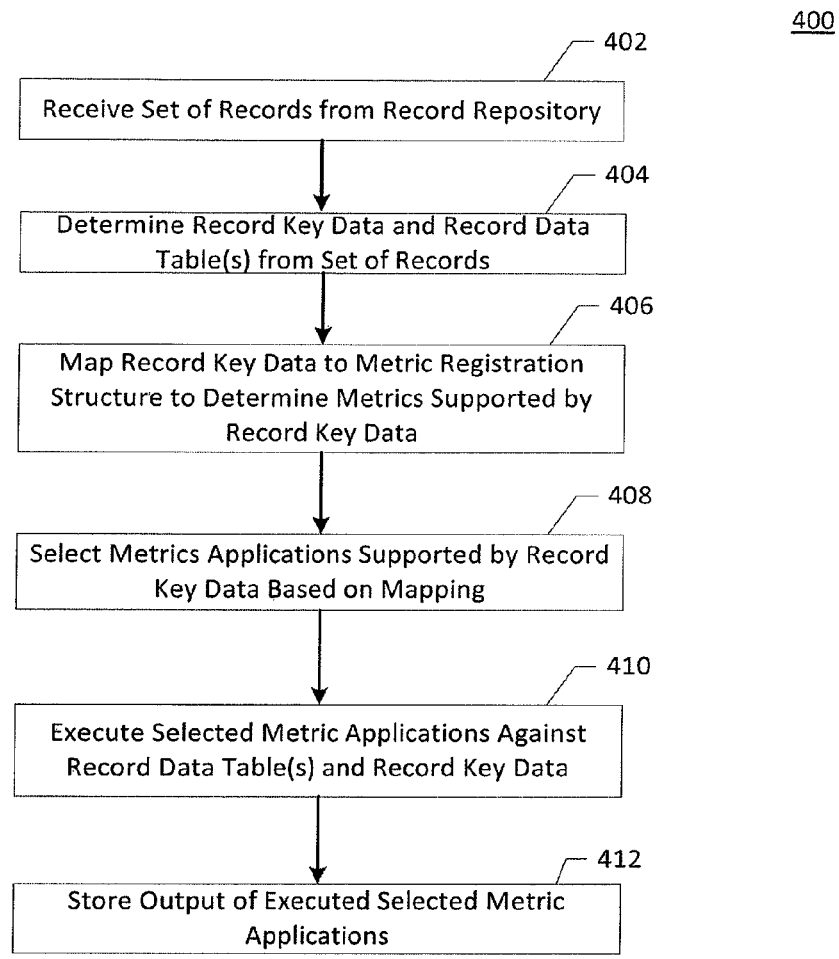

Having thus described certain embodiments of the invention in general terms, reference will now be made to the accompanying drawings, which are not necessarily drawn to scale, and wherein:

FIG. 1 is a block diagram of an apparatus that may be specially configured to perform definition and selection of metric applications in accordance with some embodiments of the present invention;

FIG. 2 is a block diagram of a dataflow between logical components of a system for defining, selecting, and executing metric applications for execution in accordance with some embodiments of the present invention;

FIG. 3 is an illustration depicting a flow diagram of a process for generating a metric application for use within a system for selecting and executing a metric application in accordance with some embodiments of the present invention; and FIG. 4 is an illustration depicting a flow diagram of a process for selecting and executing a metric application against a data set received from a data repository in accordance with some embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention to provide for definition, selection, and execution of metric applications against stored data. Embodiments advantageously allow for generation of metric applications with arbitrary code for execution. When records are received from a record storage repository, metrics that relate to data stored in the repository are selected based on a record index structure that identifies which metrics apply to which records. Selected records are compiled, if necessary, and executed against the received records. Output from the executed metrics may be stored along with intermediate calculations used to generate the output from the executed metrics. In this manner, embodiments provide for a flexible, robust system that allows for dynamic definition, selection, and execution of metrics while also improving performance by limiting the execution and compilation of metrics to metrics that are related to the particular set of received data.

To support this novel functionality, the inventors have developed various novel data structures, interfaces, functions, algorithms, databases, libraries, and the like that allow for definition of metric applications, registration of those metric applications with a metric registration structure, reception of a set of data records, selection of metric applications for execution against the set of data records, and execution of the selected metric applications. Execution of the selected metric applications may, in some embodiments, include run-time compilation/building/linking of the metric application, while in other embodiments metric applications may be compiled/built/linked prior to selection.

For the purposes of this disclosure, the term "metric application" refers to computer code stored in a compilable or executable format, which defines a particular set of processing instructions for performing calculations and/or analysis of a set of data records. The metric application necessarily is aware of one or more data types or fields of at least one record of the set of data records. For example, a metric application may include program code in a C# programming language and/or using the Language-Integrated Query (LINQ) language extension for use in accessing a particular data record or records and performing calculations using data stored in the data record or records. Metric applications are operable to receive data records in a particular application-agnostic format, such as a JavaScript Object Notation (JSON) format. The use of an application-agnostic format allows the metric application to select particular data elements of the records through the use of particular record key data known by the metric application.

Example Client Apparatus

FIG. 1 illustrates a block diagram of an apparatus 100 in accordance with some example embodiments. The apparatus 100 may be any computing device for providing for definition, selection, and/or execution of metric applications as described herein. For example, the apparatus 100 may be implemented as any device capable of receiving a set of parameters for defining and/or generating a metric application, selecting a particular metric application based on a received set of data records, and/or executing the selected metric application against the received set of data records. In some embodiments, the apparatus 100 may execute an interface and/or application for defining, generating, accessing, or modifying metric applications, and a metric registration structure may be programmatically updated as metric applications are generated, edited, deleted, and the like. In some embodiments, the apparatus 100 may execute a metric management component to control selection and execution of generated metric applications. In yet further embodiments, the apparatus 100 may both provide an interface for generating, defining, accessing, and/or modifying metric applications and also execution of a metric management component for selection and execution of metric applications based on received data records. In some embodiments the apparatus 100 also provides a record repository, while in other embodiments, the record repository may be located at a remote computing node from the apparatus 100. In this regard, the apparatus 100 may be implemented as a stand-alone or rack-mounted server, a desktop computer, a laptop computer, a personal digital assistant, a tablet computer, a netbook computer, a picture archiving and communication system (PACS) workstation, or the like. Accordingly, it will be appreciated that the apparatus 100 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, metric definition circuitry 110, metric management circuitry 112, record access circuitry 114, and metric processing circuitry 116. The apparatus 100 may be configured to execute the operations described below with respect to FIGS. 2-4. Although these components 102-116 are described with respect to functional limitations, it should be understood that the particular implementations necessarily include the use of particular hardware. It should also be understood that certain of these components 102-116 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The metric definition circuitry 110 includes hardware configured to allow a user or process to define executable code for determining at least one metric from a set of data records. The output of the metric definition circuitry 110 is a metric application as described herein. The metric definition circuitry 110 may receive a file or other input that includes instructions, in a human-readable, machine-readable, or machine-interpretable format, that are used to calculate one or more output values from data included in records retrieved by the record access circuitry 114. For example, the instructions may be provided in C#, LINQ, and/or according to various other programming languages and frameworks. The metric definition circuitry 110 may also include hardware configured to update a metric registration structure upon definition of a new metric application.

The metric registration structure may index each generated metric application and indicate a particular set of data record keys associated with each metric. In some embodiments, the metric definition circuitry 110 may compile, link, build, or otherwise generate machine-readable instructions (e.g., an application and/or a dynamic link library) corresponding to a particular metric application or group of metric applications. In some embodiments, executable code associated with metric applications is maintained as a class that defines a plurality of metrics. In some embodiments, particular clients, client facilities, and the like are associated with particular classes, metrics, or groups of metrics. Permission management and credentialing functions may be performed by the metric definition circuitry 110 for controlling edits to particular metric applications. These permissions may be stored in the metric registration structure as well control which clients or users are able to execute which metrics against particular sets of data records.

To perform these functions, the metric definition circuitry 110 may utilize the processor 102 in conjunction with the memory 104, the input/output circuitry 106 and/or the communications circuitry 108. It should also be appreciated that, in some embodiments, the metric definition circuitry 110 may include a separate processor, specially configured field programmable gate array (FPGA), or application specific interface circuit (ASIC) for defining the metric application. The metric definition circuitry 110 is therefore implemented using hardware components of the apparatus configured by either hardware or software for implementing these planned functions.

The metric management circuitry 112 is operable to control the selection and execution of particular metric applications based on various factors. In particular, the metric management circuitry 112 may utilize the metric registration structure as described above in concert with a set of metric applications and a set of received data records to determine which metric applications to execute against a received set of data records. In some embodiments, the metric management circuitry 112 may control compiling, linking, and/or building of metric applications at runtime, such as in response to receiving a particular set of data records associated with a particular metric application or set of metric applications. The metric management circuitry 112 may be operable to select particular metric applications by identifying particular data fields or other types of data (e.g., column headers or other key values) for a set of data records, such as through record key data associated with the data records, and determining which metric applications are associated with those data fields or other types of data by examining the metric registration structure. Metric applications associated with data fields or other types of data from the received set of records may be built and/or executed to execute processing included in those metrics. The metric management circuitry 112 may also function to enable access to particular metric applications by particular users, clients, or the like based on a permissioning structure associated with the metric applications. The metric management circuitry 112 may interact with the processor 102 for implementing the selection of particular metric applications as described above, though it should be appreciated that the metric management circuitry 112 may include a separate processor, FPGA, ASIC, or the like. The metric management circuitry 112 is therefore implemented using hardware components of the apparatus configured by either hardware or software for implementing these functions.

The record access circuitry 114 includes hardware configured to provide an interface to a records repository, such as a repository of electronic health records, a hospital admission-discharge-transfer system, a medical billing system, and/or the like. Although the instant examples are described with respect to a healthcare scenario, it should be appreciated that embodiments may also be applicable to other fields that utilize predefined metrics executed against a data repository. The record access circuitry 114 may include the repository itself (e.g., if the apparatus 100 is also functioning as the repository), or the record access circuitry 114 may include a network interface, one or more application programming interfaces, a cloud computing interface, or the like for receiving and/or requesting data from a remote repository. In some embodiments, the repository may be a cloud storage application, such as Microsoft® Corporation's Azure platform, Amazon® Inc.'s Simple Storage Service, or the like. The record access circuitry 114 may be operable to receive a set of data in a particular storage format (e.g., an Azure "blob") and convert the received data into a generic format, such as a JSON object. The record access circuitry 114 may also receive a control file or control object which identifies particular data fields or key values of the set of data received. The control file or control object may be provided to the metric management circuitry 112 to assist with selection of which metrics to apply against the received data. The formatted received data may be provided to the metric processing circuitry 116 for use in the execution of one or more metric applications. In some embodiments, the record access circuitry 114 includes hardware, such as the communications circuitry 108, for communication with a remote or cloud data repository. Providing of the interface to the repository and receiving and formatting received data may be performed by a processor, such as the processor 102, though it should also be appreciated that the record access circuitry 114 may include a separate processor, FPGA, ASIC, or the like for performing these and other functions. Accordingly, the record access circuitry 114 is therefore implemented using hardware components of the apparatus configured by either hardware or software for performing the various functions as described herein.

The metric processing circuitry 116 includes hardware configured to provide for execution of one or more metric applications as selected by the metric management circuitry 112. The metric processing circuitry 116 may receive as input one or more selected metric applications and a set of data against which those selected metrics are to be executed. The metric processing circuitry 116 may execute those metric applications to create a set of output. In some embodiments, the output of the executed metrics is stored in a database, returned as a return value, provided to an external application, displayed on a display, stored via a cloud storage framework, or the like. The metric processing circuitry 116 may also store one or more intermediate values associated with execution of the metric, such as, for example, a subset of records of the set of input data records used in calculation of the metric, or a version identifier or checksum associated with the set of input data records. In this manner, the metric processing circuitry 116 may advantageously provide for the ability to "check the work" of metric applications executed against a particular set of data. Processing of the selected metric applications and execution of the metric applications against a set of data records may be performed by a processor, such as the processor 102, though it should also be appreciated that the metric processing circuitry 116 may include a separate processor, FPGA, ASIC, or the like for performing these and other functions. Accordingly, the metric processing circuitry 114 is therefore implemented using hardware components of the apparatus configured by either hardware or software for performing the various functions as described herein.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example Metric Application Generation, Selection, and Execution Data Flow

FIG. 2 is an illustration of an example of a dataflow 200 for generating, selecting, and executing metric applications in accordance with example embodiments of the present invention. The dataflow 200 includes an interaction between a metric calculation system 202 (e.g., an apparatus such as described above with respect to FIG. 1), in communication with a record repository 204. The record repository 204 may be any repository for storing data records as known in the art, including network attached storage (NAS) devices, cloud storage frameworks, or the like.

The metric calculation system 202 includes various components and data structures for managing the generation, selection, and execution of metric applications. In particular, the metric calculation system 202 may include a metric definition component 206, a metric management component 218, a record access component 212, and a metric processing component 222.

The metric definition component 206 may include hardware and software configured to provide an interface for receiving a set of metric definitions (e.g., program code for accessing particular data stored within a data record and processing that data to calculate a value or values). In some embodiments, the metric definition component 206 is implemented by metric definition circuitry 110 as described above with respect to FIG. 1. The metric definition component 206 may generate metadata regarding the metric application, including a particular set of data fields or values required to execute the metric application, a unique identifier for the metric application, and access permissions associated with the metric application. The metric definition component 206 may store this metric metadata in a metric registration structure 210. The metric registration structure 210 may be implemented in a variety of different data formats. For example, the metric registration structure 210 may be a JSON object, a table in a relational database, or the like. The metric registration structure 210 may store metadata regarding each metric application defined for use by the metric calculation system such that the metric management component 218 may select one or more metric applications for execution by identifying which data values and/or record types are included in a set of received data records, and selecting metric applications that apply to those data values and/or record types. The metric definition component 206 may also provide one or more metric applications 208 generated from the metric definitions. The metric management component 218 may manage storage of these generated metric applications 208 so that the generated metric applications 208 may be executed if selected in response to received record data.

Generated metric applications 208 may be stored in various formats. For example, in some embodiments a dynamic link library (DLL) is created for one or more metrics. Metrics may be stored in various groups as well. For example, in some embodiments different client users are associated with particular metric classes, DLLs, or the like. By associating different users with different groupings of metrics applications, certain benefits may be derived. For example, if two users are associated with the same class of metric applications, and a first user wishes to add a metric application or make a change to an existing metric application stored in the class, then the second user may be prevented from using any metric stored within the metric class while the class is being rebuilt. By providing different classes for different users, this scenario may be avoided.

The record repository 204 may provide data to the metric calculation system 202 via a record access component 212. The record access component 212 may be implemented by record access circuitry 114 as described above with respect to FIG. 1. The record access component 212 may receive data from the record repository 204 in various formats. For example, in some embodiments, the data received from the record repository is provided as an Azure "blob" data type, and the record access component derives a set of record key data 214 and record data tables 216 from the blob. For example, a received set of record information may be processed by the record access component 212 to generate a JSON object containing the data provided by the record repository. The record access component 212 may also receive a control file or control object which identifies particular data fields or key values of the set of data received. In other embodiments, the data received from the record repository is preformatted into a data format suitable for consumption by one or more metric applications, and the record access component 212 does not need to reformat the data.

In some embodiments, the record access component 212 processes data received from the repository to obtain or generate a set of record key data 214. The record key data 214 identifies particular names or values associated with data fields of a set of record data tables 216 received from the record repository 204. In some embodiments, the record key data 214 may be derived from or generated from a control file as described above. The record key data 214 may function as a header or schema for interpretation of the record data tables 216. The record key data 214 is provided to the metric management component 218 for use in determining which metric applications may apply to a received set of records. The record data tables 216 and record key data 214 may be provided to the metric processing component 222 for consumption by one or more metric applications selected by the metric management component 218.

Upon receiving the set of record key data 214, the metric management component 218 may compare the record key data 214 to data fields required by each metric application as stored within the metric registration structure 210. These functions of the metric management component 218 may be performed by metric management circuitry 112 as described above with respect to FIG. 1. The metric management component 218 may determine which metric applications are associated with the received data using the record key data 214, and select each metric application that applies to the received data for execution. These selected metric applications 220 are provided to the metric processing component 222 for execution against the record key data 214 and the record data tables 216. As noted above with respect to FIG. 1, in some embodiments the metric management component 218 may also manage compiling, linking, and/or building of particular metric applications to generate executable code that may be employed by the metric processing component 222.

The metric processing component 222 functions to cause the execution of metric applications selected by the metric management component 218 against record data tables 216 provided by the record access component 212. The metric processing component 222 may be implemented by, for example, metric processing circuitry 116 as described above with respect to FIG. 1. The metric processing component 222 may cause execution of selected metric applications against the record data tables 216. In some embodiments, the record key data 214 is also provided to the metric processing component to assist with mapping fields of the record data tables 216 to data type definitions contained within the selected metric applications 220. The metric processing component 222 may store output data from the executed metric applications as one or more calculated metric results 224. The calculated metric results 224 may be stored in a database, as a JSON object, or in a variety of other formats suitable for display or transmission to a client associated with the metric application. In some embodiments, the metric processing component 222 may, as part of its functionality or as part of the functionality of the underlying executed metric application, track intermediate output of executed metric applications. For example, in a metric where data records from the record data tables 216 are first filtered before a calculation is performed, the metric processing component 222 may store data indicating which records from the record data tables 216 were filtered out and which records were used to calculate the metric results 224. Storing of such intermediate data may assist users with debugging metric applications or otherwise evaluating the results of executed metric applications, providing valuable context to the metric results.

Example Processes for Storing, Selecting, and Executing Metric Applications

FIG. 3 is a flow diagram illustrating an example of a process 300 for generating a metric application in accordance with example embodiments of the present invention. The process 300 illustrates how metric definition data may be received and utilized to generate a metric that is subsequently usable by a metric calculation system (e.g., the metric calculation system 202 described above) to be selectively executed against a set of record data. It should be appreciated that, although the present process 300 is described as generating executable code based on a set of received metric definition data, other processes may store metric applications in a non-executable form, and such metric applications may be compiled, linked, and/or built at the time the metric application is selected for execution. The process 300 may be performed, for example, by an apparatus such as the apparatus 100 described above with respect to FIG. 1 or by a metric calculation system 202 as described above with respect to FIG. 2.

At action 302, a set of metric definition data is received. As noted above, the metric definition data may be or include program code in various languages, such as C#. In general, the metric definition data is designed to accept input, such as a JSON object, and to calculate an output value to be output or stored. The logic provided by the program code of the metric definition data is generally restricted by the form of the input provided and the output expected. The actual logic that operates on the input and produces the output may be any logic implementable by the chosen programming language. For example, a set of metric definition data may include instructions for filtering received input, extracting certain values from the received input, calculating a result based on certain formulas applied to the extracted values, and providing the result as output.

At action 304, input requirements for the particular metric application are determined. These requirements may be derived based on the input data required by the metric application to perform the defined calculations. In this manner, embodiments of the process may examine the metric definition data and compare data types required by the metric definition data to a set of known data types associated with particular file or record types, and store those particular file or record types. Alternatively, in some embodiments the process may note which data types are required from the metric definition data and store an indication of those required data types. At action 306, the data identified at action 304 is stored in a metric registration structure. As described above with respect to FIG. 2, the metric registration structure may be employed to identify which metric applications may be applied to a set of incoming data by determining which data types are present within the set of incoming data and which metric applications have their appropriate data dependencies satisfied by the set of incoming data.

At action 308, the metric definition data itself is stored. As noted above, the metric definition data may be stored in an executable format, in which case it may be used to generate executable code at action 310, while in other embodiments the metric definition data may be stored in an uncompiled format for run-time compilation by a metric management component.

FIG. 4 is a flow diagram illustrating an example of a process 400 for selecting and executing one or more metric applications based on received data records in accordance with some example embodiments of the present invention. The process 400 is operable to receive a set of data records and determine a set of data types or record types associated with those data records. The set of data types or record types are compared against a metric registration structure to identify which metrics apply to the data types or record types. Those selected metrics are then executed against the data stored within the received set of data records to calculate one or more metrics. The calculated metrics are then output for storage, display to a user, or for various other purposes. The process 400 may be performed, for example, by an apparatus such as the apparatus 100 described above with respect to FIG. 1, and/or through the use of a metric calculation system 202 as described above with respect to FIG. 2.

At action 402, a set of record data is received from a record repository as described above with respect to FIGS. 1-2. At action 404, record key data and record data tables are determined from the set of record data. As indicated above, the set of record data may be preformatted by the record repository into the record key data and the record data tables, or a record access component may format the set of received data records to derive the record key data and the record data tables.

At action 406, the record key data is mapped to a metric registration structure to determine which metric applications described in the metric registration structure are supported by the record key data. As described above, this process may also include the evaluation of particular credentials associated with a user, selection of a particular class or library of metrics, or various other methods of constraining the set of metric applications evaluated in conjunction with the record key data. At action 408, metric applications identified at action 406 are selected for execution. At action 410, the selected metric applications are executed using the set of record data and the record key data as input to the metric applications. As noted above, execution of the selected metric applications may also include compiling, linking, and/or building the metric applications in response to their selection. Execution of the selected metric applications may also include generation of intermediate data as described above, such as a list of which particular records or fields of the record data tables were used during execution of the metric application.

At action 412, output of the executed selected metric applications is stored. As noted above, the output may include one or more values that are the result of calculations performed by the metric, stored intermediate values used in calculation of the metric, or the like.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for executing metric applications against a set of record data, comprising:

receiving, via record access circuitry, the set of record data from a record repository;
determining, by a processor and from the set of record data, record key data and one or more record data tables for the set of record data, wherein the record key data identifies names or values associated with data fields of the one or more record data tables;
selecting, by metric management circuitry, one or more metric applications based on a mapping performed between record key data and a metric registration structure, wherein the metric registration structure comprises metric application metadata indicating data types, including data fields or values, required by each of a plurality of metric applications, and wherein selecting one or more metric applications comprises identifying one or more metric applications that, pursuant to the metric application metadata associated therewith, require the data fields identified by the record key data for the set of record data;
cause execution of each of the selected one or more metric applications by the processor including compiling, linking or building the one or more metric applications in response to their selection;
determining an output of each of the executed selected one or more metric applications; and
storing the output in a memory.

2. The method of claim 1, wherein the output of each of the executed selected one or more metric applications comprises at least one result of a calculation performed by the metric application, an intermediate value determined during performance of the metric application and a list of records included within the set of record data used to obtain the result of the calculation.

3. The method of claim 1, wherein at least one of the selected one or more metric applications are generated by metric definition circuitry, and wherein the method further comprises:
receiving, by the metric definition circuitry, metric definition data;
determining at least one required data type for performing one or more calculations defined in the metric definition circuitry; and
creating an entry in the metric registration structure, the entry comprising a unique identifier associated with a metric application generated from the metric definition data and the at least one required data type.

4. The method of claim 3, wherein the metric definition data is provided in a C# programming language.

5. The method of claim 1, wherein the record repository is a cloud data storage system.

6. The method of claim 1, further comprising generating the record key data and the record data tables upon receipt of the set of record data from the record repository by the record access circuitry.

7. The method of claim 1, wherein the record data tables are formatted by the record access circuitry into a JavaScript Object Notation format.

8. An apparatus for executing metric applications against a set of record data, comprising:
record access circuitry configured to receive the set of record data from a record repository; and
metric management circuitry configured to:
determine, from the set of record data, record key data and one or more record data tables for the set of record data, wherein the record key data identifies names or values associated with data fields of the one or more record data tables;
select one or more metric applications based on a mapping performed between record key data and a metric registration structure, wherein the metric registration structure comprises metric application metadata indicating data types, including data fields or values, required by each of a plurality of metric applications, and wherein the metric management circuitry is configured to select one or more metric applications by identifying one or more metric applications that, pursuant to the metric application metadata associated therewith, require the data fields identified by the record key data for the set of record data;
cause execution of each of the selected one or more metric applications by metric processing circuitry including compiling, linking or building the one or more metric applications in response to their selection; and
the metric processing circuitry configured to:
determine an output of each of the executed selected one or more metric applications; and
store the output in a memory.

9. The apparatus of claim 8, wherein the output of each of the executed selected one or more metric applications comprises at least one result of a calculation performed by the metric application, an intermediate value determined during performance of the metric application and a list of records included within the set of record data used to obtain the result of the calculation.

10. The apparatus of claim 8, further comprising metric definition circuitry configured to:
generate the selected one or more metric applications by:
receiving metric definition data;
determining at least one required data type for performing one or more calculations defined in the metric definition circuitry; and
creating an entry in the metric registration structure, the entry comprising a unique identifier associated with a metric application generated from the metric definition data and the at least one required data type.

11. The apparatus of claim 10, wherein the metric definition data is provided in a C# programming language.

12. The apparatus of claim 8, wherein the record repository is a cloud data storage system.

13. The apparatus of claim 8, wherein the record access circuitry is further configured to generate the record key data and the record data tables upon receipt of the set of record data from the record repository.

14. The apparatus of claim 8, wherein the record data tables are formatted by the record access circuitry into a JavaScript Object Notation format.

15. A non-transitory computer readable storage medium comprising instructions that, when executed by a processor, configure the processor to:
receive the set of record data from a record repository;
determine, from the set of record data, record key data and one or more record data tables for the set of record data, wherein the record key data identifies names or values associated with data fields of the one or more record data tables;
select one or more metric applications based on a mapping performed between record key data and a metric registration structure, wherein the metric registration structure comprises metric application metadata indicating data types, including data fields or values, required by each of a plurality of metric applications, and wherein selecting one or more metric applications comprises identifying one or more metric applications that, pursuant to the metric application metadata associated therewith, require the data fields identified by the record key data for the set of record data;

cause execution of each of the selected one or more metric applications including compiling, linking or building the one or more metric applications in response to their selection;

determine an output of each of the executed selected one or more metric applications; and store the output in a memory.

16. The computer readable storage medium of claim 15, wherein the output of each of the executed selected one or more metric applications comprises at least one result of a calculation performed by the metric application, an intermediate value determined during performance of the metric application and a list of records included within the set of record data used to obtain the result of the calculation.

17. The computer readable storage medium of claim 15, wherein at least one of the selected one or more metric applications are generated by metric definition circuitry, and wherein the instructions further configure the processor to:

receive metric definition data;

determine at least one required data type for performing one or more calculations defined in the metric definition circuitry; and create an entry in the metric registration structure, the entry comprising a unique identifier associated with a metric application generated from the metric definition data and the at least one required data type.

\* \* \* \* \*